United States Patent
Pilevar et al.

(10) Patent No.: US 6,633,711 B1
(45) Date of Patent: Oct. 14, 2003

(54) FOCUSED ION-BEAM FABRICATION OF FIBER PROBES FOR USE IN NEAR FIELD SCANNING OPTICAL MICROSCOPY

(75) Inventors: Saeed Pilevar, Gaithersburg, MD (US); Klaus Edinger, Laurel, MD (US); Walid Atia, Lexington, MA (US); Igor I. Smolyaninov, College Park, MD (US); Christopher C. Davis, Bowie, MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/584,788

(22) Filed: Jun. 1, 2000

Related U.S. Application Data

(60) Provisional application No. 60/136,882, filed on Jun. 1, 1999.

(51) Int. Cl.[7] .............................. G02B 6/00; G02B 6/02
(52) U.S. Cl. ....................................... 385/123; 385/128
(58) Field of Search ........................... 385/43, 12, 123, 385/127, 128; 359/368

(56) References Cited

U.S. PATENT DOCUMENTS

| | | | | |
|---|---|---|---|---|
| 5,288,999 A | * | 2/1994 | Betzig | 250/227.11 |
| 6,104,030 A | * | 8/2000 | Chiba | 250/306 |
| 6,236,783 B1 | * | 5/2001 | Mononobe | 385/43 |
| 6,285,811 B1 | * | 9/2001 | Aggarwal | 385/31 |

OTHER PUBLICATIONS

Pohl, D. et al., "Optical stethoscopy: Image recording with resolution λ/20", Appl. Phys. Lett., 44(7), Apr. 1, 1984 pp. 651–653.

Betzig, E. et al., "Breaking the diffraction barrier: Optical microscopy on a nanometric scale", Science,. 251, Mar. 22, 1991, pp 1468–1470.

Synge, E.H., Philos. Mag. 6, 356 (1928).

Valaskovic, G. et al., "Parameter control, characterization, and optimization in the fabrication of optical fiber near–field probes", Applied Optics, vol. 34, No. 7, Mar. 1, 1995, pp 1215–1228.

(List continued on next page.)

*Primary Examiner*—Brian Healy
*Assistant Examiner*—Kevin S Wood
(74) *Attorney, Agent, or Firm*—Sterne, Kessler, Goldstein & Fox P.L.L.C.

(57) ABSTRACT

A method of forming a fiber probe having an aperture for use in near-field scanning optical microscopy. The method includes a first steps of coating an optical fiber having a tapered tip with a metal layer. Next is a step of milling the tapered tip and metal layer such that an aperture is formed through the metal layer at the tapered tip. The milling step includes focused ion-beam milling the tapered tip and metal layer. The focused ion-beam milling can be done by raster scanning the focused ion-beam in a rectangular pattern at an apex of the tapered tip. Also, the fiber probe made through the above outlined method is used in near-field scanning optical microscopy.

16 Claims, 2 Drawing Sheets

OTHER PUBLICATIONS

Ambrose, W. et al., "Alterations of single molecule fluorescence lifetimes in near–field optical microscopy", Science, vol. 265, Jul. 15, 1994, pp. 364–367.

Shchemelinin, A. et al., "A simple lateral force sensing technique for near–field micropattern generation", Rev. Sci. Instrum., vol. 64, No. 12, Dec. 1993, pp. 3538–3541.

Betzig, E. et al., "Near–field magneto–optics and high density data storage", Appl. Phys. Lett. 61 (2), Jul. 13, 1992, pp 142–144.

Jiang, S. et al., "Nanometric scale biosample observation using a photon scanning tunneling microscope", Jpn. J. Appl. Phys., vol. 31 (1992) pp. 2282–2287.

Zeisel, D. et al., "Pulsed laser–induced desorption and optical imaging on a nanometer scale with scanning near–field microscopy using chemically etched fiber tips", Appl. Phys. Lett., 68(18), Apr. 29, 1996, pp. 2491–2492.

Maheswari, R. et al., "Deducing structural variations of the apex of probes used in near–field optical microscopy through simultaneous measurement of shear force and evanescent intensity", Applied Optics, vol. 35, No. 34, Dec. 1, 1996, pp. 6740–6743.

Islam, M. et al., "Rapid taper fiber probes for near–field spectroscopy with enhanced efficiency and resolution", Conference on Lasers and Electro–Optics, 11, 70 (Optical Society of America, Washington, DC, 1997).

Betzig, E. et al., "Near–field optics: Microscopy, spectroscopy, and surface modification beyond the diffraction limit", Science, vol. 257, Jul. 10, 1992, pp. 189–195.

Obermuller, C. et al., "Far field characterization of diffracting circular apertures", Appl. Phys. Lett., 67(23), Dec. 4, 1995, pp. 3408–3410.

Durkan, C. et al., "Observation of magnetic domains using a reflection–mode scanning near–field optical microscope", Appl. Phys. Lett., 70(10), Mar. 10, 1997, pp. 1323–1325.

Muller, K. et al., "Microstructuring of gold on x–ray masks with focused $Ga^+$ ion beams", SPIE, vol. 1263, pp. 12–20.

Atia, W. et al., "A phase–locked shear–force microscope for distance regulation in near–field optical microscopy", Appl. Phys. Lett. 70(4), Jan. 27, 1997, pp. 405–407.

Veerman, J. et al., "High definition aperture probes for near–field optical microscopy fabricated by focused ion beam milling", Appl. Phys. Lett., vol. 72(24), Jun. 15, 1998, pp. 3115–3117.

* cited by examiner

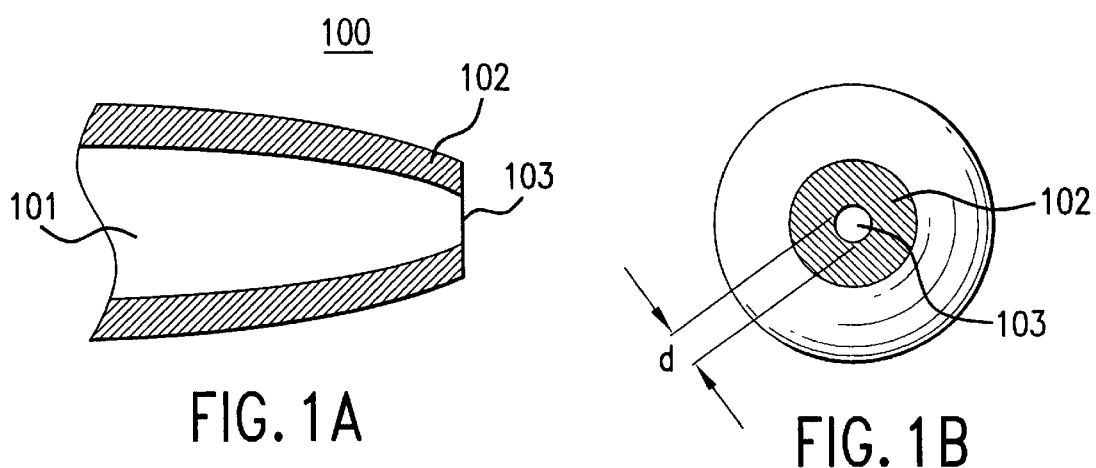
FIG. 1A
FIG. 1B
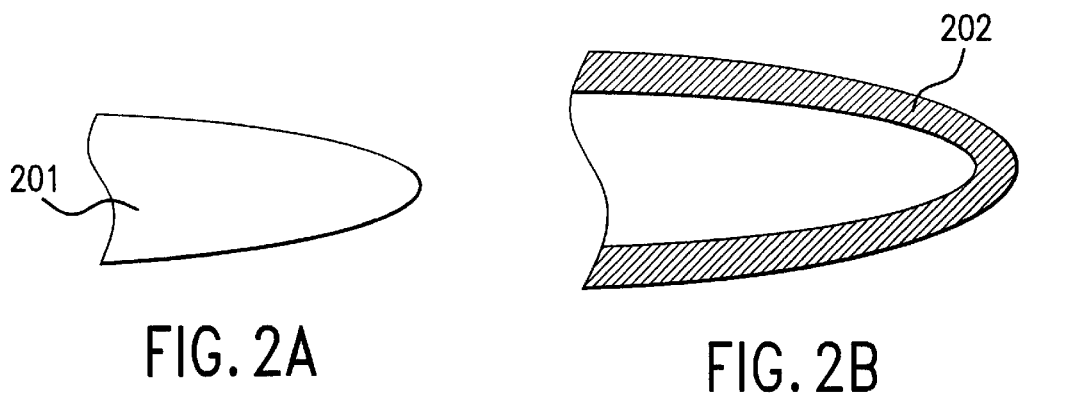
FIG. 2A
FIG. 2B
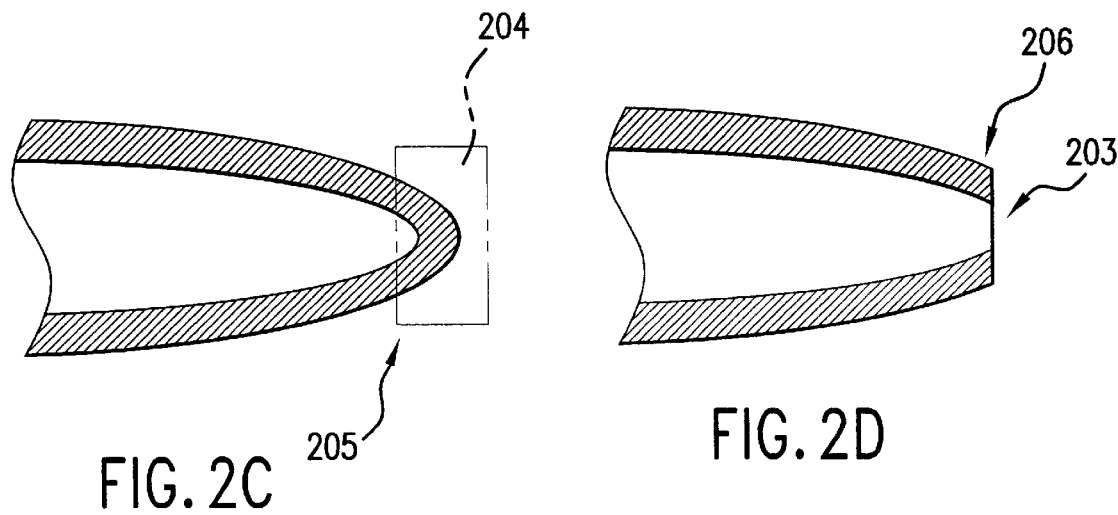
FIG. 2C
FIG. 2D

FOCUSED ION-BEAM FABRICATION OF FIBER PROBES FOR USE IN NEAR FIELD SCANNING OPTICAL MICROSCOPY

This application claims priority to U.S. provisional application serial No. 60/136,882, filed Jun. 1, 1999, which is hereby incorporated by reference.

STATEMENT AS TO RIGHTS TO INVENTIONS MADE UNDER FEDERALLY-SPONSORED RESEARCH AND DEVELOPMENT

This invention was made with U.S. Government support under Contract No. MDA 904-97-C-3570, awarded by Maryland Procurement Office.

BACKGROUND OF THE INVENTION

1. Field of the Invention

This invention is related to the fabrication of fiber probes for use in near-field scanning microscopy. More specifically, this invention is related to a focused ion-beam fabrication method for well-defined subwavelenth fiber probes with metallic apertures.

2. Related Art

Near-field scanning optical microscopy (NSOM) is capable of subwavelength optical resolution by breaking the diffraction limit of conventional optical microscopy. The optical near field of a source exists within a distance of less than one optical wavelength from that source. By placing an aperture of much less than the optical wavelength in a metal screen placed in near-field proximity to a sample, NSOM can achieve a resolving power below that of classical optical microscopy.

Conventional practical implementation of such an aperture has been accomplished by first tapering down an optical fiber to subwavelength diameter. Such tapering can be performed, for example, through a heating-pulling technique. In such a technique, a fiber is put under tension while heat is applied. The heat can be from a $CO_2$ laser, for example. As the fiber heats under tension it can be separated into two pieces, each having a tapered end. Modifying the tension used, and the amount of heat applied, determines the size and shape of the taper.

Alternatively, chemical etching can be used to form an optical fiber with a tapered end. In such a technique, an optical fiber is immersed in an acid such as hydrofluoric acid. If this is done appropriately, the result is a tapered tip. As with the heating-pulling method, the size and shape of the fiber can be altered during the chemical etching technique. For example, the speed at which the fiber is pulled from the acid can be modified so as to change the shape of the tapered region.

A hybrid pull-etch technique can also be used to form tapered fibers. Such a technique involves both heating-pulling as well as chemical etching. Tapered regions are first formed with the heating-pulling technique, discussed above. Next, the tapered-tips of the fibers are subjected to chemical etching.

Once a tapered fiber is produced in accordance with a technique like those discussed above, or otherwise known to one skilled in the relevant art, an angle-evaporation process is preformed to provide a partial metal coating on the fiber. This partial metal coating covers the sidewalls of the tapered fiber, resulting in an aperture located at the end of the fiber. The process is conducted through vacuum deposition of aluminum, gold, chromium, or another appropriate metal by thermal evaporation while the tip of the fiber is rotated and held at an angle to the source.

The exposed fiber tip created through the above process is generally located inside a metallic aperture that is partially obstructed by rough aluminum grains situated near the aperture boundary. Frequently, such an aperture contains aluminum protrusions, contributing to the poor polarization capabilities common to fiber tips produced through conventional methods. Likewise, these defects can also result in a larger than optimal separation of fiber tip and sample as well as the absence of a clean opening, which can lead to lower throughput of the probe and poor optical resolution of the NSOM. Furthermore, the angle-evaporation process is very time consuming and typically does not result in the fabrication of a batch of reproducible and well-defined apertures of desired diameter. Moreover, other problems associated with angle evaporation are the fabrication of a special holder to accommodate many fibers with adjustable tilt angle, the loading of the probes, and the difficulty associated with keeping the fibers untangled throughout the procedure.

What is needed is a method of producing clean, well-defined, and highly reproducible subwavelength apertures for NSOM that minimizes those problems associated with the conventional techniques discussed above.

SUMMARY OF THE INVENTION

In an embodiment of the instant invention, a method of forming a fiber probe having an aperture for use in near-field scanning optical microscopy is disclosed. The disclosed method includes a first step of coating an optical fiber having a tapered tip with a metal layer. The tapered tip can be formed with a heating-pulling process, an etching process, or a combination of the two.

Once the optical fiber is coated with the metal layer, there is a step of milling the tapered tip and metal layer such that an aperture is formed through the metal layer at the tapered tip. The coated metal layer can be an aluminum, gold, or chromium layer. The metal layer can be a sputtered layer having a thickness of less than 150 nanometers, preferably between 20 and 150 nanometers, and more preferably between 100 and 150 nanometers.

The milling step includes focused ion-beam milling the tapered tip and metal layer and can be preceded by a step of imaging the tapered tip with an electron beam. The focused ion-beam milling can be done by raster scanning the focused ion-beam in a rectangular pattern at an apex of the tapered tip such that portions of the metal layer and tapered tip are removed at the apex, forming an aperture through the metal layer. An overlap of the rectangular pattern and the apex of the tapered tip is chosen so as to produce an aperture having a predetermined diameter. The predetermined diameter can be less than a wavelength of light used in the near-field scanning optical microscopy. Preferably, the predetermined diameter can be approximately 100 nanometers or less.

Also disclosed is a fiber probe for use in near-field scanning optical microscopy made through the above outlined method. Thus, the fiber probe according to an embodiment of the invention includes an optical fiber having a tapered tip, a metal layer coated on said optical fiber at the tapered tip, and a focused ion-beam milled aperture through the metal layer at an end of the tapered tip. The metal layer can be an aluminum layer, a chromium layer, or a gold layer having a thickness of less than 150 nanometers, preferably between 20 and 150 nanometers, and more preferably between 100 and 150 nanometers.

The fiber probe of the present invention can have a focused ion-beam milled aperture with a diameter less than a wavelength of light used in the near-field scanning optical microscopy. Preferably, the diameter is approximately 100 nanometers or less. Furthermore, the optical fiber and the metal layer have co-planar exterior end surfaces at a terminal end of said tapered tip, with the exterior end surface of the metal layer surrounding the exterior end surface of the optical fiber.

BRIEF DESCRIPTION OF THE FIGURES

The accompanying drawings, which are incorporated herein and form part of the specification, are illustrations of the present invention and, together with the description, further serve to explain the principles of the invention and to enable a person skilled in the pertinent art to make and use the invention. Like reference numbers refer to like elements within the different figures.

FIGS. 1A and 1B are illustrations of a fiber probe in accordance with an embodiment of the present invention.

FIGS. 2A–2D are illustrations of a fiber probe in accordance with an embodiment of the present invention at various points during manufacture.

DETAILED DESCRIPTION OF THE PREFERRED EMBODIMENTS

Figure 3:
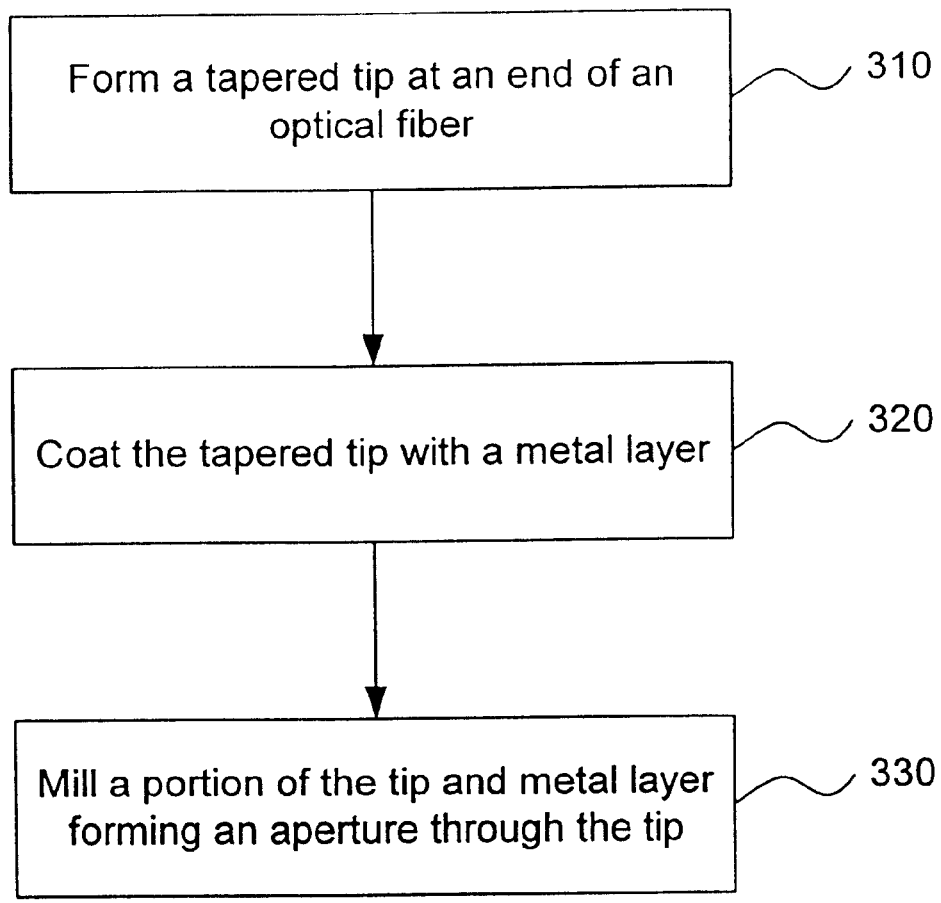
FIG. 3 is an illustration of the process flow of a method of making a fiber probe in accordance with the present invention.

FIG. 1A illustrates a fiber probe 100 having an aperture for use in near-field scanning optical microscopy according to an embodiment of the present invention. FIG. 1B is an end-view of the structure of FIG. 1A. The fiber probe 100 of FIG. 1A includes a tapered tip 101 located at the end of an optical fiber (not shown). The optical fiber is formed of glass, quartz, or any other material capable of use as a fiber probe in NSOM. The tip 101 is coated with a metal layer 102. The metal can be aluminum, though other metals can be used without departing from the scope of the instant invention. For example, chromium and gold can also be used. The metal layer has a thickness of less than 150 nanometers, preferably between 20 and 150 nanometers, and more preferably between 100 and 150 nanometers, though other thicknesses could be chosen without departing from the scope of the instant invention.

The metal layer 102 has an aperature 103 through which the tip 101 is exposed. The aperture 103 has a diameter d. The diameter d of aperture 103 is less than a wavelength of light used during the NSOM process, i.e., subwavelength. The diameter d can be set accurately through the method used to form the fiber probe, discussed below. The diameter d of aperture 103 can thus be formed with any appropriate diameter and is preferably significantly below the wavelength used. For example, in an embodiment of the present invention, the diameter d is formed to be approximately 100 nanometers. Diameters less than, or greater to 100 nanometers can also be formed, for example 300 or 50 nanometers, without departing from the scope of the instant invention. As a result of the method used to produce the fiber probe 100 of FIG. 1A, which will be described below, the aperture 103 is clean, well-defined, and highly reproducible. In addition to the well defined edge of the aperture, as can be seen in FIG. 1B, the tip of the fiber probe at the aperture is planar with the edge of metal layer 102, as can be seen in FIG. 1A. Because the probe end is flat and free of aluminum protrusions, the optical contrast is much less affected by topographically induced intensity changes. Thus, fiber probe 100 does not suffer from those drawbacks associated with conventional fiber probes made through conventional methods. The optical throughput of the fiber probe of FIG. 1A is higher than conventional fiber probes, and the aperture can give the true near-field optical contrast of a sample without the influence of tip protrusions.

Next will be discussed a method of making the fiber probe 100 of FIG. 1A in accordance with an embodiment of the instant invention. FIGS. 2A–2D are illustrations of a fiber probe at various stages of manufacture, while FIG. 3 is a flow-chart illustrating steps involved in the disclosed method.

In a first step 310 of the method of FIG. 3, a tapered tip is formed at an end of an optical fiber. As discussed above, the fiber can be glass, quartz, or any other fiber with optical properties suitable for NSOM, as would be apparent to one skilled in the relevant art. In order to form the tapered tip, one or more of the methods discussed above in connection with conventional methods can be used. Preferably, the heating-pulling method is used. Etching, or a combination of heating-pulling and etching can also be used. Tip geometry plays a role in aperture diameter, as will be seen below. A high tip aspect ratio (i.e. a more "pointed" tip) will allow for more precise control of the final aperture diameter. However, high aspect ratio tips have less through put because the evanescent wave propagates through a longer region. Thus, the parameters of the heating-pulling process should be adjusted to obtain probes with optimum shapes and throughputs, as would be apparent to one skilled in the relevant art. FIG. 2A illustrates a tapered tip of an optical fiber 201 after completion of the first step 310.

In a next step 320, the tapered tip 201 is coated with a metal layer 202, as shown in FIG. 2B. Preferably, aluminum is used, though other metals could be used without depart from the scope of the instant invention. For example, chromium or gold can be used. Metal layer 202 can be applied with a sputtering unit of the type usually used to metal coat specimens prior to inspection by scanning electron microscopy. For example, an rf sputterer can be used. Metal layers applied with such a unit are smooth and exhibit no leakage or pin holes upon injection of laser light into such fiber probes. The thickness of metal layer 202 is less than 150 nanometers, preferably between 20 and 150 nanometers, and more preferably between 100 and 150 nanometers, though other thicknesses could be used without departing from the scope of the instant invention. When applying the metal layers, more than one fiber can coated at a time using the sputtering unit. For example, batches of 10–15 fibers can be coated at once by placing the fibers together in the sputtering unit. Whatever method is used to coat the fibers, uniformity is important. Since subsequent milling is related to a known metal thickness, non-uniformity can produce undesirable results.

In a next step 330, the tips of the metal coated fibers are milled in order to create a subwavelength aperture at the apex of the tip. Preferably, focused ion-beam (FIB) milling is used. In order to perform this milling, the ion beam is raster scanned in a rectangular region at the tip of the fiber. FIG. 2C illustrates such a rectangular region 204. By varying the size of the rectangular scanned region 204, a cleancut aperture of a desired diameter can be precisely formed. In one embodiment, a dual-beam system can be used. Such a dual-beam system includes a FIB as well as a focused electron beam. With such a system, the electron beam is first used to image the fiber tip. Once the tip is imaged, the FIB is scanned in the manner described above. Alternatively, a single FIB system can be used. In such a system, the same beam is used to image as well as to mill the fiber tip. In either system, the metal-coated fiber tip should be grounded prior to imaging to avoid charge build-up at the tip. Such grounding can be accomplished, for example, by using silver paint to connect the metal layer on the fiber tip to ground. Such silver paint can later be removed with acetone. Other methods of grounding the tip can be used without departing from the scope of the instant invention.

While the raster scanning technique discussed above is preferred since it produces accurately sized apertures, other techniques could be used without departing from the scope of the instant invention. For example, a single pass of the FIB could be made at the edge 205 of the rectangular region 204, to produce the desired aperture.

The milling step generally takes about 2–3 minutes. Once the milling is complete, as shown in FIG. 2D, an aperture 203 is formed at the end 206 of the fiber probe. The fiber probe of FIG. 2D thus corresponds to that of FIGS. 1A and 1D.

Such FIB milled fiber probes were laboratory tested in a near-field system. Near-field distance regulation was maintained through the use of shear force phase-locked tuning fork feedback. The sample imaged was a series of lines of various widths of from $1\mu$ to 100 nm. These samples were produced by coating a glass substrate with a 50 nm layer of aluminum. This layer was then milled with the FIB to produce the lines. These lines were then imaged using a FIB milled fiber probe having a tip with a 100 nm aperture. A He—Ne laser was used ($\lambda$=633 nm). Under such circumstances, the optical images produced yielded resolution of about 100 nm.

Other Applications

While the fiber probes described above in connection with the present invention have been described in terms of their use in NSOM, such probes have utility in other fields. By virtue of the metal layer 120 in the fiber probe 100 of FIG. 1A, for example, the fiber probe can be used in scanning-tunneling microscopy as well as in scanning-microwave spectroscopy. The metal layer provides the necessary conductor in such applications, and can be modified in thickness as appropriate. Moreover, a fiber probe in accordance with the present invention can also be used in atomic force microscopy.

Due to the small size of the tip of a fiber probe in accordance with the present invention, such a fiber probe can also be used in systems that support more than one type of microscopy. For example, a fiber probe in accordance with the present invention can be inserted into the scanning probe of another type (i.e., other than NSOM) of scanning microscope by forming a small hole in that probe to accommodate the fiber probe. In this way, other types of scanning microscopes can also be used for performing NSOM.

In addition to microscopy, fiber probes according to the present invention can also be used to perform various types of surface modification through their ability to receive and also precisely deliver a controllable amount of light. For example, such fiber probes can be used to deliver or collect light from optical memory system. Likewise, fiber probes in accordance with the present invention can be used to deliver light to photo-chemically alterable materials. In this way, information can be stored by recording that information in such alterable materials with a fiber probe according to the present invention. Such information can subsequently be read with the same, or similar, fiber probe.

Fiber probes in accordance with the instant invention can also be used to correct mask defects, for example on a reticle used during semiconductor device manufacturing. Such a mask defect could be an unwanted line or pattern piece on the mask itself By using a fiber probe according to the present invention, light can be delivered through the probe to the mask defect area. The energy of the light can be set at an intensity to ablate the unwanted line or pattern piece on the mask. In this way, the mask can be repaired through the use of a fiber probe according to the present invention.

Conclusion

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. For example, while the tapered probes used are described as those being formed through the use of heating-pulling or etching or both, the milling process described could be performed with other types of fiber-tips such as bent fiber-tips, coaxial fiber-tips, micro-fabricated fiber tips, and the like. Thus, the breadth and scope of the present invention should not be limited by any of the above-described exemplary embodiments, but should be defined only in accordance with the following claims and their equivalents.

What is claimed is:

1. A method of forming a fiber probe having an aperture for use in near-field scanning optical microscopy comprising the steps of:

coating an optical fiber having a tapered tip with a metal layer;

focused ion-beam milling the tapered tip and metal layer such that an aperture is formed through the metal layer at the tapered tip; and imaging the tapered tip with an electron beam prior to said step of focused ion-beam milling the tapered tip and metal layer.

2. The method claim 1, wherein said step (a) comprises coating the optical fiber with a metal selected from the group consisting of aluminum, chromium, and gold.

3. The method of claim 2, wherein said step (a) comprises coating the optical fiber with aluminum.

4. The method of claim 1, wherein said step (a) comprises coating the optical fiber with a metal layer having a thickness of less than 150 nanometers.

5. The method of claim 4, wherein said step (a) comprises coating the optical fiber with a metal layer having a thickness of between 20 and 150 nanometers.

6. The method of claim 5, wherein said step (a) comprises coating the optical fiber with a metal layer having a thickness of between 100 and 150 nanometers.

7. The method of claim 1, wherein said step (a) comprises sputtering.

8. A method of forming a fiber probe having an aperture for use in near-field scanning optical microscopy comprising the steps of:

coating an optical fiber having a tapered tip with a metal layer; and focused ion-beam milling the tapered tip and metal layer such that an aperture is formed through the metal layer at the tapered tip, wherein said step of focused ion-beam milling comprises raster scanning the focused ion-beam in a rectangular pattern at an apex of the tapered tip such that portions of the metal layer and tapered tip are removed at the apex, forming said aperture through the metal layer.

9. The method of claim 8, wherein an overlap of the rectangular pattern and the apex of the tapered tip is chosen so as to produce an aperture having a predetermined diameter.

10. The method of claim 9, where an overlap of the rectangular pattern and the apex of the tapered tip is chosen such that the predetermined diameter is less than a wavelength of light used in the near-field scanning optical microscopy.

11. The method of claim 10 wherein the overlap is chosen such that the predetermined diameter is less than 100 nanometers.

12. The method of claim 10, wherein the overlap is chosen such that the predetermined diameter is approximately 100 nanometers.

13. A method of forming a fiber probe with an aperture for use in near-field scanning optical microscopy comprising the steps of:

(a) forming a tapered tip-at an end of an optical fiber;

(b) coating said tapered tip with an aluminum layer; and (c) focused ion-beam milling a portion of the tapered tip and aluminum layer such that an aperture is formed through the aluminum layer at the end of the optical fiber, wherein said step (c) comprises raster scanning the focused ion-beam in a rectangular pattern at an apex of the tapered tip.

14. The method of claim 13, wherein said step (a) comprises a heating-pulling step.

15. The method of claim 13, wherein said step (a) comprises a chemical etching step.

16. The method of claim 13, where said step (b) comprises sputtering.

* * * * *